No. 607,370. Patented July 12, 1898.
J. J. HEYS.
SOLE MOLDING MACHINE.
(Application filed Apr. 30, 1897.)
(No Model.) 2 Sheets—Sheet 1.
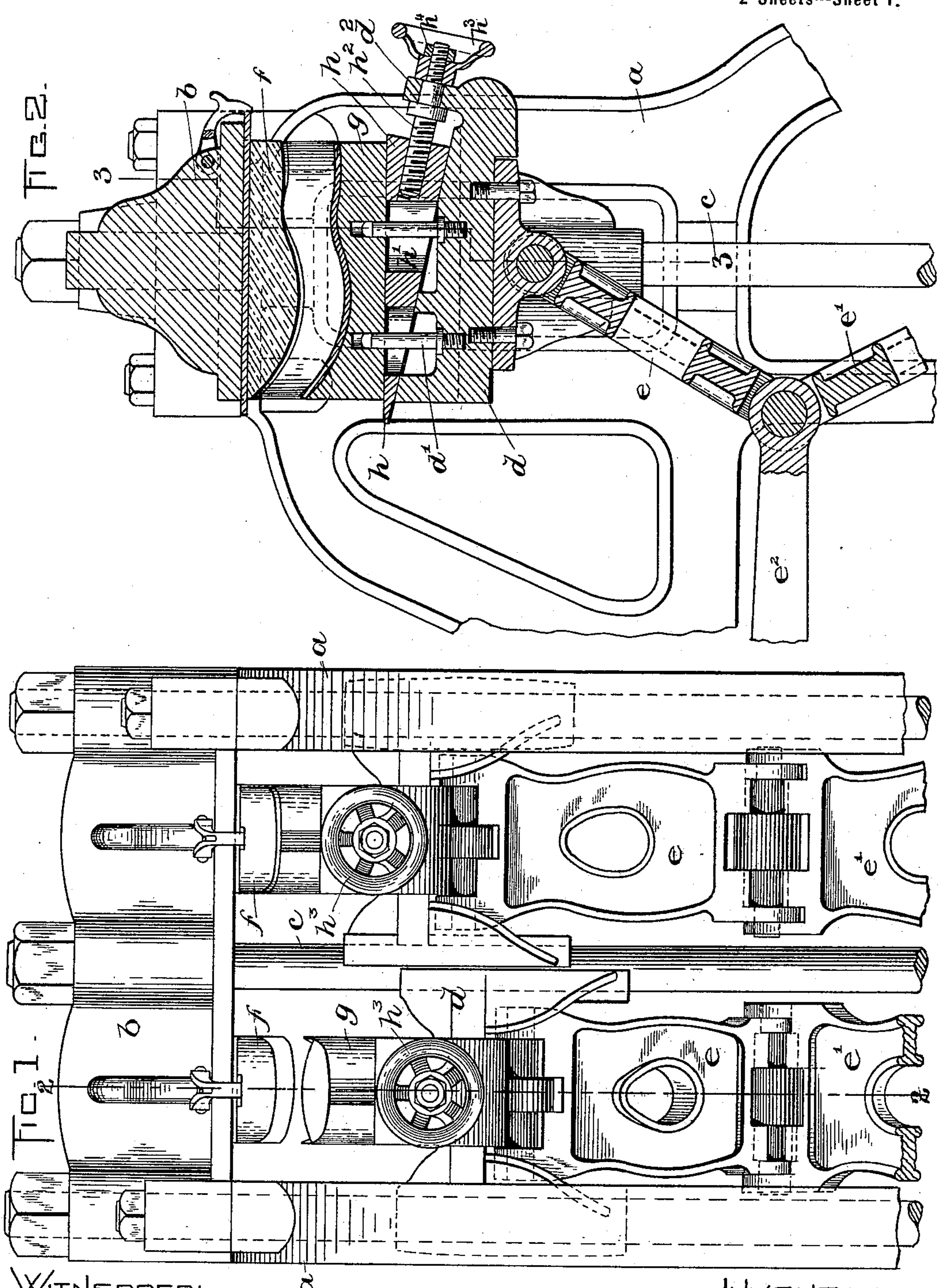
Witnesses:
A. D. Harrison
P. W. Pezzetti
Inventor:
John J. Heys
by Wright Brown & Quinby
Attys.
THE NORRIS PETERS CO., PHOTO-LITHO., WASHINGTON, D. C.

No. 607,370. Patented July 12, 1898.
J. J. HEYS.
SOLE MOLDING MACHINE.
(Application filed Apr. 30, 1897.)
(No Model.) 2 Sheets—Sheet 2
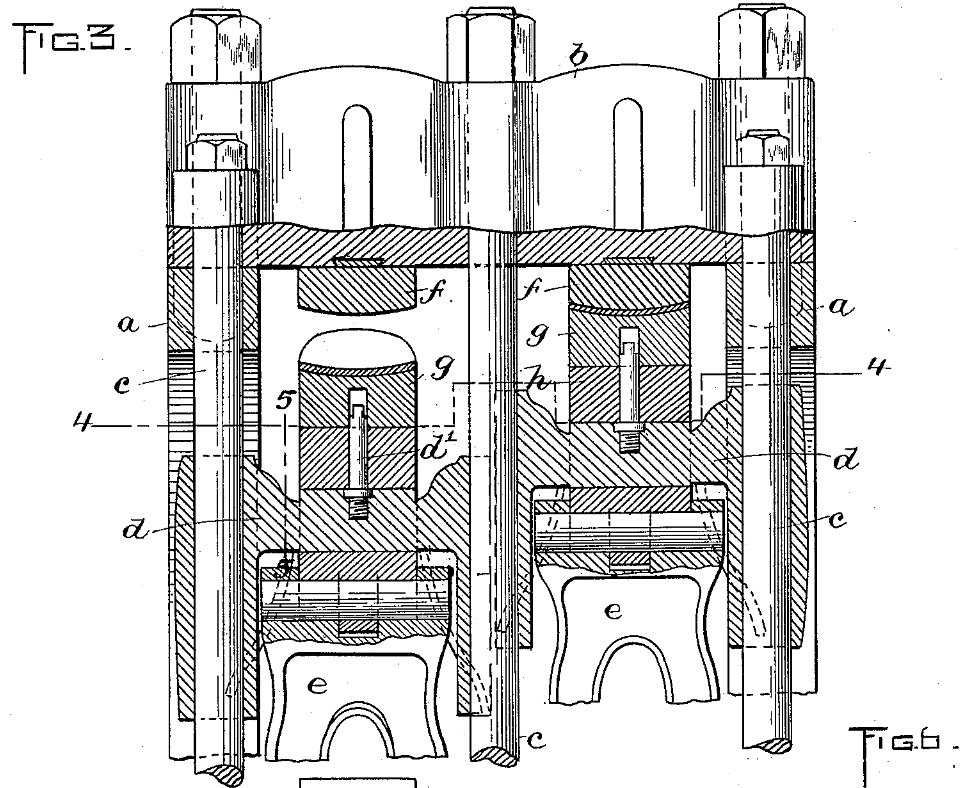
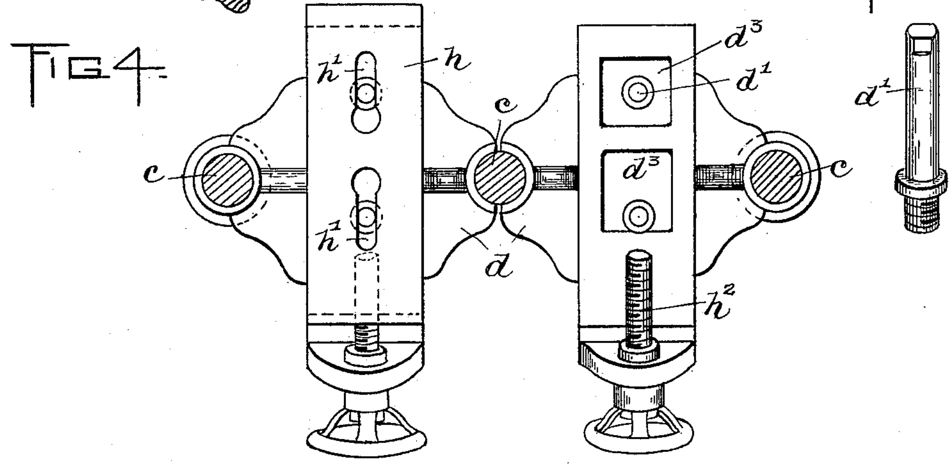
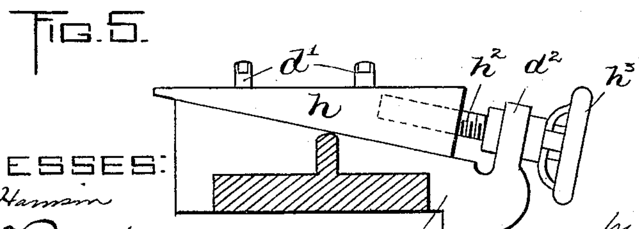
WITNESSES:
A. D. Harrison
P. W. Pezzetti.
INVENTOR:
John J. Heys
by Wright Brown & Quinby
Attys.
THE NORRIS PETERS CO., PHOTO-LITHO., WASHINGTON, D. C.

UNITED STATES PATENT OFFICE.

JOHN J. HEYS, OF LYNN, MASSACHUSETTS, ASSIGNOR OF ONE-HALF TO MAURICE V. BRESNAHAN, OF SAME PLACE.

SOLE-MOLDING MACHINE.

SPECIFICATION forming part of Letters Patent No. 607,370, dated July 12, 1898.

Application filed April 30, 1897. Serial No. 634,638. (No model.)

*To all whom it may concern:*

Be it known that I, JOHN J. HEYS, of Lynn, in the county of Essex and State of Massachusetts, have invented certain new and useful Improvements in Sole-Molding Machines, of which the following is a specification.

This invention has relation to machines for molding the soles of boots and shoes, and has for its object to provide certain improvements in the same to increase their measure of efficiency, whereby each sole will be powerfully compressed in such way as to permanently maintain its shape; and it consists in the combination and arrangement of parts hereinafter described in the specification, fully illustrated in the accompanying drawings, and particularly pointed out in the appended claims.

Reference is to be had to the accompanying drawings, and to the letters marked thereon, forming a part of this specification, the same letters designating the same parts or features, as the case may be, wherever they occur.

Of the drawings, Figure 1 represents in front elevation the upper portion of a sole-molding machine embodying my improvements. Fig. 2 represents a vertical longitudinal section of the same on the line 2 2 of Fig. 1. Fig. 3 represents a vertical transverse section on the line 3 3 of Fig. 2. Fig. 4 represents a transverse horizontal section of the machine on the line 4 4 of Fig. 3. Fig. 5 represents a section on the line 5 5 of Fig. 4. Fig. 6 represents in detail one of the guide-pins for the movable die or mold.

Referring to the drawings, a machine is shown in which is embodied my invention; but inasmuch as the invention relates more particularly to the dies, the supports therefor, and the adjusting features I have only shown the upper portion thereof. It will of course be understood that I do not limit myself in any way to this particular embodiment, as it is selected only for the purpose of presenting one illustration of the invention.

The machine is provided with two side standards *a a*, to which is rigidly bolted a cross-head *b*. Vertical bars *c* are also passed through the cross-head and the frame to bind them rigidly together, the said bars at the same time providing guides for the movable die-supports *d*. The said die-supports are moved vertically toward and from the cross-head by toggle-levers *e e'*, operated by a connecting-rod $e^2$, driven from any suitable source of power. Preferably there are two die-supports, which are operated alternately or independently, as may be desired.

Secured to the cross-head *b*, so as to be readily removable therefrom, are the stationary non-yielding dies or molds *f f*, the exposed surfaces of which are curved to conform to the shape of the sole of the last to which the compressed sole is to be fitted. The movable coacting dies *g*, which are supplemental in shape to the dies *f*, are mounted upon the die-supports *d* and are firmly held against transverse movement by guides or pins *d'* in threaded engagement with the supports and projecting into apertures in the said dies *g*. Between each movable die and its support is placed a wedge *h*, having its inclined under surface bearing against the inclined upper surface of the support *d*. Each wedge is provided with elongated apertures *h'*, through which the guides *d'* pass into the apertures in the die *g*, so as to allow it to be moved transversely of the lines of movement of the movable die for adjusting the said die *g* downward and from the die *f*. For the purpose of adjusting the said wedges each is provided with a threaded aperture to receive a screw-bar $h^2$, journaled in a lug $d^2$, projecting upwardly from the outer edge of the support *d*, upon which the wedge is mounted. The outer end of the screw-bar is provided with a hand-wheel $h^3$, screwed thereon and held in place by a lock-nut $h^4$. By rotating the hand-wheel the wedges may be adjusted transversely, so as to adjust the movable dies toward and from the stationary die. By means of this arrangement the movable dies are supported upon solid abutments and at the same time are capable of a delicate adjustment, so as to provide for different thicknesses of soles being pressed to the required degree. For the sake of lightness the supports *d* are hollowed out, as at $d^3$, though this is a mere matter of mechanical detail and is not material.

The lower stationary pivots for the lower toggle-levers *e'*, which pivots are not shown, are stationary and unyieldingly mounted, so that when the toggle-levers are straightened out to force the movable dies or molds against the stationary dies or molds the soles are compressed with a powerful pressure between them.

The employment of a wedge in connection with the vertical guides *d'* insures that the movable die is adjusted evenly, whereby the pressure on the sole is equal on its entire surface.

Having thus explained the nature of the invention and described a way of constructing and using the same, though without attempting to set forth all of the forms in which it may be made or all of the modes of its use, I declare that what I claim is—

1. In a sole-molding machine in combination a frame, a stationary die, a movable die, a support for the movable die, means for moving said support toward and from the stationary die, a wedge placed between the movable die and its support, and means for guiding said die in the lines of its translatory movement when the wedge is adjusted.

2. In a sole-molding machine in combination a frame, a stationary die, a movable die, a support for the movable die, means for moving said support toward and from the stationary die, a wedge placed between the movable die and its support, means for guiding the die in the lines of its translatory movement, and means for adjusting the wedge.

3. In a sole-molding machine in combination a frame, a stationary die, a movable die, a support for the movable die, said support having an inclined upper surface, a wedge placed between the support and said movable die, and guides for guiding the wedge and the die.

4. In a sole-molding machine in combination, a stationary die, a movable die, a support for the said movable die, a wedge inserted between said movable die and its support, a guide extending through an aperture in the wedge and from the support into an aperture in the movable die, and a screw-shaft for adjusting said wedge transversely of the lines of movement of the movable die.

5. In a sole-molding machine, in combination, a stationary die, a movable die, a support for said movable die, guides for guiding said movable die in the lines of its movement, a wedge inserted between the movable die and its support and having an aperture to receive the guides for the movable die, a screw-shaft journaled in a lug in said support for adjusting the wedge transversely of the lines of movement of the said movable die, and a hand-wheel or handle secured to the end of said screw-shaft.

In testimony whereof I have signed my name to this specification, in the presence of two subscribing witnesses, this 10th day of April, A. D. 1897.

JOHN J. HEYS.

Witnesses:
A. D. HARRISON,
C. F. BROWN.